United States Patent
Klein

[11] 3,789,268
[45] Jan. 29, 1974

[54] MINIATURE CIRCUIT BREAKER WITH ELECTRONIC TRIPPING MEANS

[75] Inventor: Keith W. Klein, Simsbury, Conn.

[73] Assignee: General Electric Company, New York, N.Y.

[22] Filed: Dec. 29, 1972

[21] Appl. No.: 319,759

[52] U.S. Cl.............. 317/18 D, 317/58, 317/27 R, 29/593, 29/602
[51] Int. Cl. .......................................... H02h 3/26
[58] Field of Search .... 317/18 D, 27 R, 58; 29/593, 29/602, 606

[56] References Cited
UNITED STATES PATENTS
3,636,482  1/1972  Edmunds.......................... 317/18 D OTHER PUBLICATIONS
Quick–Guard Circuit Breaker, Square D Company; September, 1971.

*Primary Examiner*—James D. Trammell
*Assistant Examiner*—Harvey Fendelman
*Attorney, Agent, or Firm*—Robert T. Casey; Philip L. Schlamp; Frank L. Neuhauser

[57] ABSTRACT

A small electric circuit breaker of the type having separable contacts and a manually and automatically operable mechanism for operating the contacts. In addition to the usual prior art automatic operating means, causing opening of the contacts upon the occurrence of predetermined current or voltage magnitude conditions, the circuit breaker includes means for detecting minute ground fault conditions, such as five milliamperes (5 ma.) and for tripping the circuit breaker on the occurrence of such a ground fault. The means for detecting such minute ground fault conditions and for tripping the circuit breaker in response thereto includes signal generating means such as a differential transformer, solid state electronic circuitry, for processing the ground fault signal, and a tripping solenoid. The signal generating means and the electronic circuitry are preferably pre-assembled in a subassembly or "ground fault sensing module," before assembly into the circuit breaker.

In accordance with the invention, assembly, testing, and salvaging of parts of the ground fault sensing module are facilitated by embedding or "potting" certain portions in the module housing, such as signal-generating transformers, and removably mounting certain other portions, such as electronic signal processing components, at least until certain critical testing of the module is completed. Following such testing, all components may be embedded or "potted" or, in the alternative, the module may be assembled into the circuit breaker without further potting of components.

12 Claims, 7 Drawing Figures

MINIATURE CIRCUIT BREAKER WITH ELECTRONIC TRIPPING MEANS

FIELD OF THE INVENTION

My invention relates to electric circuit breakers, and more particularly to electric circuit breakers which are relatively small in size and which include electronic tripping means.

BACKGROUND OF THE INVENTION

Electric circuit breakers of the type referred to are small in size, measuring typically 3½ inches long by 2½ inches high, by about 1 inch or ½ inch wide per "pole." The casings or housings of such circuit breakers are of molded insulating material, and contain, in each pole, a pair of separable contacts and current-magnitude sensing means. The breaker also includes at least one operating mechanism including an externally accessible handle for moving all the pairs of contacts between open and closed circuit condition. The contacts are positioned in or surrounded by an arc extinguishing chamber or "arc chute" which enables the breaker, despite its small size, to interrupt available short circuit currents having potential values as high as 10,000 amperes at 120 volts.

Such circuit breakers are commonly used in residential or commercial or industrial buildings to control branch circuits having a rating of 15, 20, 30, 50 or 100 amperes.

The means for automatically operating contacts from closed to open circuit condition has historically included means responsive to abnormal current conditions (and in some instances, abnormal voltage conditions) in the circuit in which the circuit breaker is connected. Thus, for example, prior art circuit breaker mechanisms commonly include a normally latched, releasable member. The current (or voltage) responsive means operates by causing release of the releasable member on the occurrence of certain abnormal current conditions in the circuit. Typical means for causing release of the releasable member have included a bimetallic strip heated by the current. When the current exceeds a predetermined amount for a predetermined period of time, the bimetallic strip bends and causes release of the latch. Also included in such circuit breakers has typically been electromagnetic means for causing release of the latched member if the current reaches a certain predetermined level such, for example, as eight or ten times the nominal value of current in the circuit, regardless of how long it remains at such level. Since the first type of current responsive means responds relatively slowly to relatively small overload currents and relatively quickly to relatively high overload currents, this type of current responsive member is commonly referred to as "inverse-time" current responsive means, and will be referred to herein as such. The electromagnetic trip means, on the other hand, operates very quickly and does not vary in time of response in accordance with amount of current, but operates with no intentional time delay. This type will be referred to as "direct acting" current responsive means.

In addition to current responsive means such as bimetallic strips and electromagnetic means, which operate in response to abnormal current magnitude in the circuit, electric circuit breakers have been recently developed which respond to abnormal current paths, and particularly to the flow of current to ground by an unintended path, normally referred to as a "ground fault."

An electric circuit breaker including means for automatic opening including inverse-time, direct-acting, and ground fault tripping means, is disclosed in copending application Ser. No. 171,770, assigned to the same assignee as the present invention. Circuit breakers of the type of the aforesaid application not only respond to ground fault currents, but respond to such currents of extremely low magnitude such, for example, as five milliamperes (0.005 amperes). Accordingly such circuit breakers are capable of providing protection against injury to persons by electric shock, as well as protection against the starting of fires by ground fault currents.

Such extreme sensitivity (5 milliamperes) is achieved by use of special sensing means, combined with electronic circuitry. A typical technique, as described in the aforesaid application, comprises use of means which detects a minute unbalance or difference of currents in the outgoing and return lines to an electrical load by means of a "differential transformer." A particular problem in incorporating electronic ground fault tripping means in small circuit breakers has been the construction of such breakers of sufficiently small size so as to be interchangeable with prior art comparable circuit breakers and capable of mounting in the same space in circuit breaker panel assemblies as circuit breakers previously provided without such electronic tripping means.

The electronic ground fault tripping circuitry utilized in such circuit breakers includes three major components: (1) current (or voltage) monitoring means such as current unbalance signal generating means, e.g., a "differential transformer," (2) electronic signal processing means, including electronic signal amplifying means and/or an "electronic switch" which may comprise a gate-controlled solid state semi-conductor device such as an SCR (silicon controlled rectifier) device, and (3) a tripping solenoid which is activated by the signal processing means, to trip the circuit breaker.

In sensitive ground-fault responsive circuit breakers of the type described, the circuitry comprising the current unbalance signal generating means, and any other components which may be considered to be desirable, and the electronic "signal processing" means preferably are included in a unitary sub-assembly which is preferably assembled and tested in the form of a self-contained "module," and then assembled along with the tripping solenoid, in the circuit breaker with which it is to be used.

Since the ground fault signal which is to be detected and responded to is of such small magnitude, e.g., 5 milliamperes or less, extremely accurate assembly techniques must be utilized. This applies particularly to the current unbalance signal generating means when it takes the form of a differential transformer, as well as to any other transformers, if used. Differential transformers, for example, usually comprise a torroidal type transformer in which one or more windings comprise windings of relatively fine wire wound on a torroid core, and one or more windings of relatively heavy wire which simply pass through the torroid, forming a "single turn" winding. In such arrangements, the "single-turn" windings, which simply pass through the torroid as well as the torroid itself, may easily move with respect to each other. Even a small movement can affect the performance of the unit. It is therefore desirable to fix such windings, including the heavy wires which pass through such torroids with relation to each other. A common method of accomplishing this is by the "potting" technique, in which the components and their windings are positioned in their optimum position, and in which a liquid is poured around the components including the signal processing components, and allowed to harden.

Because of the extremely small magnitude of the signal which must be detected and responded to, a certain number of such assemblies may be found, despite all reasonable means of guarding against it, to be outside of acceptable "tolerances," and these must be discarded, since after the potting operation, the embedded components cannot be salvaged.

OBJECTS OF THE INVENTION

It is an object of the invention to provide an electric circuit breaker including electronic tripping means such as sensitive ground fault tripping means, which lends itself to practical mass production manufacturing techniques.

It is another object of the invention to provide an electric circuit breaker of the type described in which sub-assemblies as described above which require "potting" or other irreversible assembly techniques can be assembled and tested and in which, if it is found necessary to discard the same, will permit the salvaging of important and relatively expensive portions.

It is a further object of the invention to provide an electric circuit breaker including electronic tripping means in the form of an electronic signal generating and processing module which, although utilizing the potting technique for maintaining certain critical parts in optimum positions, nevertheless permits the salvaging of certain other parts of the module if the module proves upon final testing, to be outside acceptable tolerance variations.

DETAILED DESCRIPTION OF THE INVENTION IN ONE FORM

Figure 1:
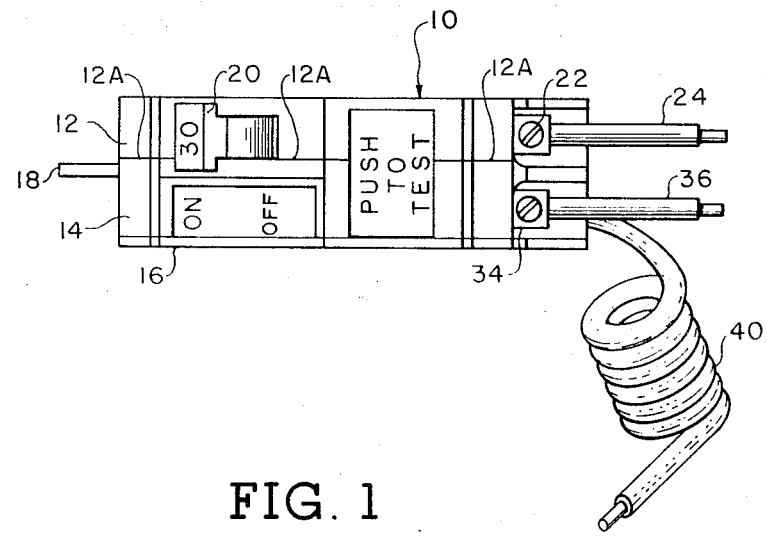
FIG. 1 is a top plan view of a miniature electric circuit breaker incorporating the invention.
Figure 2:
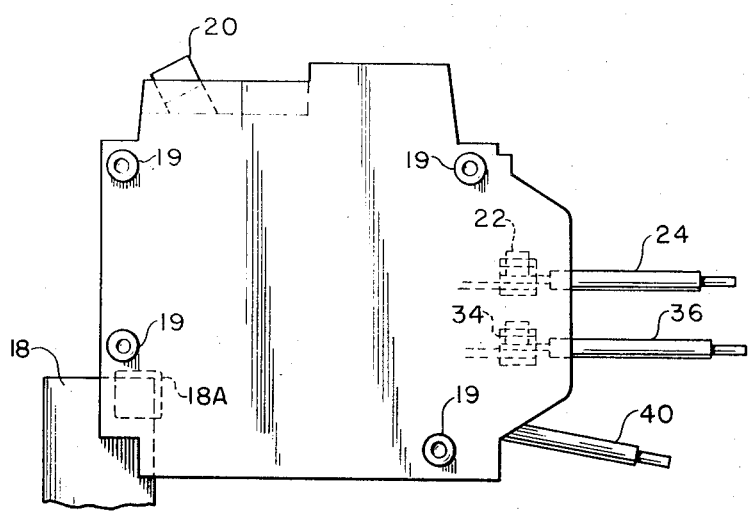
FIG. 2 is a side elevation view of the circuit breaker of FIG. 1.

Referring to FIGS. 1 and 2, the invention is shown as incorporated in an electric circuit breaker indicated generally by the numeral 10 and comprising an insulating casing made up of three parts, comprising sections 12, 14, and a cover 16. The parting line between the casing section 12 and the casing section 14 is indicated at 12A. The casing sections 12, 14, and 16 are held in assembled relation by suitable means such as by rivets 19, see FIG. 2. If desired, first fastening means, such as tubular rivets may be used to retain the portion 12 and 14 together, and second fastening means, such as solid rivets thinner than the aforesaid tubular rivets, may be used to attach the cover 16, passing through the center of the tubular rivets. The portion 12 of the circuit breaker casing houses the circuit breaker proper, that is, the separating contacts, to be described, the operating mechanism, and the inverse-time and direct-acting current responsive means, all of which taken together make up what may be regarded as the equivalent of a prior art conventional circuit breaker of the ½-inch width type, for example, as shown in U.S. Pat. No. 3,464,040 issued Aug. 26, 1969, to D. B. Powell, and assigned to the same assignee as the present invention.

Figure 4:
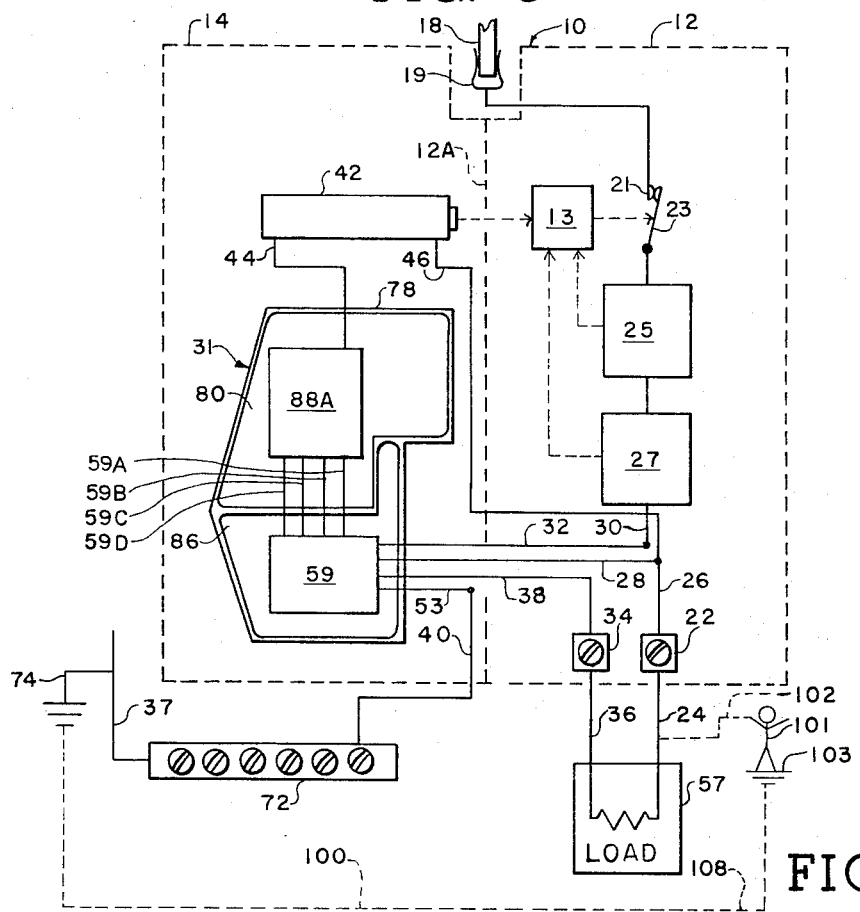
FIG. 4 is a diagrammatic drawing showing the various parts of the circuit breaker of the invention in the installed condition and indicating the electrical circuit paths involved, including the load.

A plug-in type line terminal 18A, see FIGS. 2 and 4, is supported in a recess between the casing sections 12 and 14, to make contact with a stationary blade-type line contact 18. The circuit breaker portion 12 includes an operating handle 20, and an outgoing load terminal 22, adapted to receive an outgoing load conductor 24.

Referring to FIG. 4, the section 12 of the circuit breaker which, as stated, is preferably only ½ inch in width, also contains relatively separable contacts 21 and 23, and a mechanical operating mechanism 13, to which the handle member 20 is connected.

The operating mechanism 13 may be of any suitable type capable of moving the contacts 21, 23 automatically from closed to open position by relatively small force applied by a suitable current responsive means. A typical mechanism suitable for such use is that shown in the aforesaid U.S. Pat. No. 3,464,040.

The section 12 contains inverse-time acting current responsive tripping means represented diagrammatically by the box 25. Such inverse-time tripping means, for example, might be a bimetallic strip heated in response to current through the circuit breaker, or other inverse-time acting means.

The section 12 also preferably contains a "directacting" tripping means 27, such as an electromagnetic device, which acts in response to current through the circuit breaker without intended or varying time delay.

After passing into and out of the ground-fault detecting module, by means of conductors 30, 32, 28, 26, the current path in section 12 goes to the terminal 22. The user connects a power consuming load 57 to the circuit breaker by means of outgoing conductor 24, and return conductor 36, which are connected to the terminals 22 and 34 respectively. From the terminal 34, the current path goes again into and out of the ground fault module 31 by conductors 38, 40. The output terminal or wire 40 is connected to "neutral bar" 72. and thence to the main neutral conductor 37, which ordinarily is connected to ground, as at 74, see FIG. 4.

Figure 3:
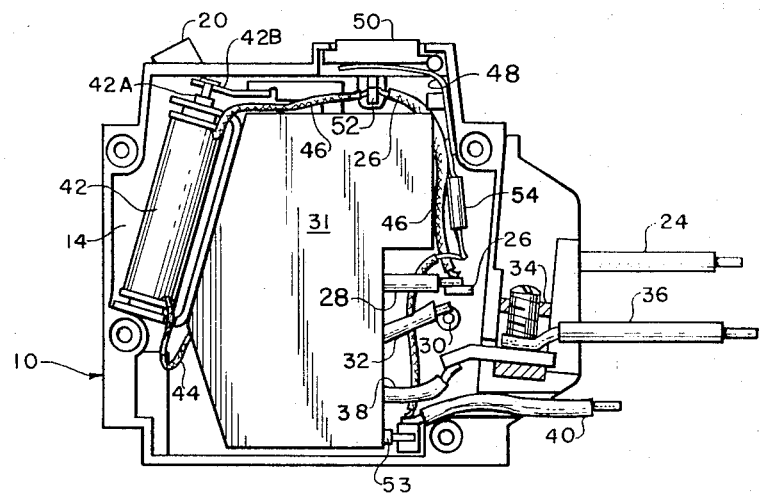
FIG. 3 is a view similar to FIG. 2 but with the side of the enclosing casing nearest the viewer removed to show the electronic or ground fault module and solenoid.

The casing section 14 encloses the parts required for the sensitive ground fault protection, including the ground fault electronic module 31. The connections to these parts are shown in FIGS. 3 and 4. Referring to FIG. 3, the conductor member 26 projects through the wall of the casing section 14 and has connected to it a conductor 28 leading into the ground fault module 31. Also, a second conductor 32 is connected to conductor 30, also projecting through the wall of the casing section 14. The section 14 also supports a terminal connector 34, having connected to it the load return conductor 36 as mentioned above. The terminal 34 is connected to the ground fault module 31 by conductor 38. Finally, the circuit through the ground fault module 31 is completed by the terminal conductor 40 which projects out of the circuit breaker and is provided with sufficient length so that the user can connect the conductor 40 to a neutral bar 72 connected to the return side of the line 37, as previously described, see FIG. 1.

The provision of a length of conductor 40 instead of a fourth conventional wire connecting terminal, is simply for the purpose of facilitating installation of the breaker in a panel as indicated in FIG. 4. If desired, a terminal such as terminals 22 and 34 may be provided, and the conductor 40 omitted from the circuit breaker 10.

Also contained within the casing section 14 is a solenoid 42, see FIGS. 3 and 4, which is connected to the ground fault module 31 by means of conductor 44. The other end of the solenoid 42 is connected by means of conductors 46 and 26 to the "high" side of the line such as by being connected to the conductor 26 as shown in FIGS. 3 and 4.

For the purpose of permitting testing of the ground fault tripping ability of the circuit breaker 10, after complete assembly, means is provided for manually creating a controlled ground fault. This means includes a resilient conductive spring member 48 see FIG. 3, which is adapted to be deflected by a test button 50 so as to make contact with a contact member 52 which is connected to the "high" side of the line conductor 26. The other end of the resilient member 48 is connected through the resistor 54 to the neutral or ground side of the line by being connected to the terminal 53 and the neutral conductor 40.

It will be apparent that by depressing the test button 50, the resilient strip 48 is brought into contact with the contact 52, thereby creating an intentional ground path between the line side of the circuit from the terminal 26 to the return or neutral side of the circuit 40 through the resistor 54. If all parts are in operating condition, the unbalance created by this controlled ground fault, which is above 5 ma., will cause the breaker to trip.

CONSTRUCTION AND ASSEMBLY OF THE GROUND FAULT MODULE

Figure 5:
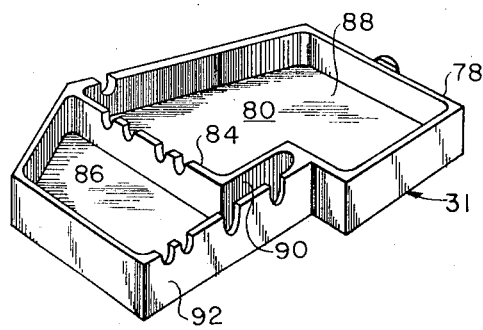
FIG. 5 is a perspective view of the housing of the ground fault module.

The ground fault module 31, as shown in FIG. 5, includes a generally tray-shaped housing 78 of insulating material. In accordance with the invention, the housing 78 is divided by transverse barrier 84 into two compartments, 80 and 86, for a purpose to be described.

The chamber or compartment 86 contains the fault signal generating means, which may comprise one or more miniature differential transformers (not shown but included in the components represented by the rectangle 59 in FIG. 4). The outgoing load line, comprising serially-connected conductors 26 and 30 (which may form parts of one continuous conductor) passes through the aforesaid differential transformer, forming a first primary winding. In addition, the return load line, comprising serially connected conductors 38 and 40, also passes through the differential transformer forming a second primary winding. The differential transformer also has a secondary winding, which develops a voltage signal if and when there is an unbalance of currents in the outgoing and return load conductors, indicating presence of a ground fault.

Because of the high sensitivity of the device (5 ma.), the position of the differential transformer, with respect to its "primary winding" conductors passing through it, as well as any other transformers and their similar windings, are very critical. One practical way of establishing a fixed position for these parts in accordance with prior art, is by "potting," or pouring a liquid in the chamber 86 and allowing it to harden around the aforesaid parts. A suitable potting compound, for example, is the class of insulating materials known as "epoxies." Such potting procedure performs the additional important function of providing high dielectric insulation between the components. It also prevents condensation of moisture in the chamber 86, which could adversely affect insulation or dielectric conditions between the components, protects them for accidental damage during the handling necessary for testing, etc.

The electronic circuitry in compartment 80 preferably includes solid state signal amplifying means, the output stage of which preferably is connected to a gate-controlled relatively high power capacity device such as a silicon-controlled rectifier (SCR), not shown, which in effect acts as an electronic switch, energizing the tripping solenoid 42. Circuits suitable for use in this connection are shown in U.S. Pat. No. 3,619,723, Walden, Nov. 9, 1971, and U.S. Pat. No. 3,657,604, Willard, Apr. 18, 1972, both assigned to the same assignee as the present invention, and in U.S. Pat. No. 3,611,035, Douglas, Oct. 5, 1971.

The operation of the invention will be described, for the sake of clarity and simplicity, assuming that the only ground fault existing is that created by a person indicated by the figure 101, who accidentally comes in contact with the "high" side of the load line 24, as indicated by the dotted line 102 while standing or otherwise in contact with ground as at 103.

Since the person 101 is in contact with the high side of the line as described, and also with ground, he would ordinarily experience an electric shock which, in certain cases, could be fatal. The ground path of the current would be from the person, through the ground path 100, to the opposite side of the line, i.e, conductor 37.

Since the current path just described does not include the return conductor 36, the differential transformer (not shown) "sees" more current in the outgoing conductor 26, 30, 24 than it sees in the return conductor 36, 38, 40. Assuming this difference to be at least 5 milliamperes, the differential transformer (in rectangle 59) develops a signal which is transmitted to the electronic circuitry 88A, causing triggering "on" of the output SCR which energizes the solenoid 42, which in turn acts on the trip means of the operating mechanism 13, causing quick opening of the contacts 21, 23, removing the voltage from the outgoing load line 26, 30, 24.

The mechanics of this action are that the plunger 42A of the solenoid 14 is drawn into the solenoid 42 and moves the tripping member 42B, which rotates the latch member (not shown) of circuit breaker 12, releasing the mechanism to move to tripped position. Tripping of the circuit breaker 12 is indicated by movement of the operating handle to a "trip indicating" position.

As previously stated, in accordance with the invention, the ground fault module 31 is constructed so as to (1) facilitate testing of the module with assurance that no changes will thereafter occur in the module following such testing which will adversely affect its performance, and (2) permit salvaging of important relatively expensive parts thereof should such testing indicate that the assembled module does not perform up to required standards.

For these purposes, in accordance with the invention, parts which it is desirable to embed or "pot" prior to "first stage" testing are segregated from components which do not require such potting prior to such testing, while nevertheless providing a unitary sub-assembled module.

Thus in assembly, the components in the chamber 86 of the housing 78 are assembled, positioned, connected, and subjected to "first" stage testing, and calibrated — i.e., adjusted in position to give optimum performance. The components in chamber 86 are then embedded or "potted" as previously described. The barrier 84 prevents the potting compound from flowing into the chamber 88. For the purpose of facilitating further necessary connections, leads such as 59A, 59B, 59C, 59D, to be connected to the electronic circuitry board 88A, as well as connections 32, 28, 38 and 53, are left projecting from the chamber 86 after potting.

Figure 6:
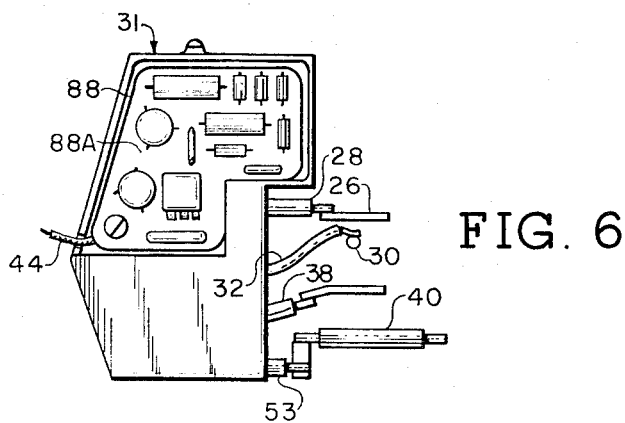
FIG. 6 is a plan view of the ground fault module of the invention in assembled condition, in one form.

The components in the chamber 80 are preferably mounted on an insulating support 88A as shown in FIG. 6, and are then assembled in the chamber 80, and interconnected with the components in chamber 86.

Figure 7:
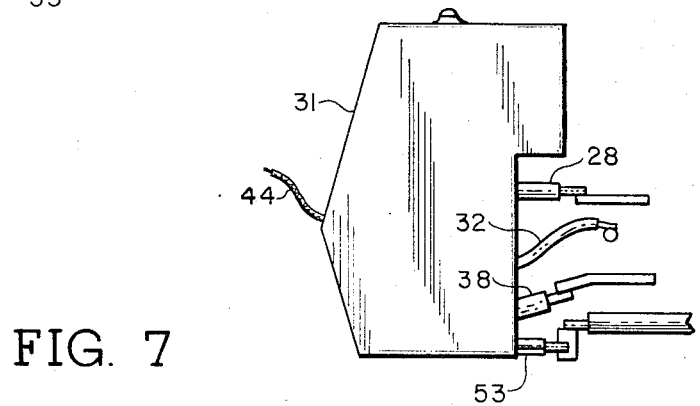
FIG. 7 is a plan view of the ground fault signal module in assembled condition in accordance with another form of the invention.

The condition of the module at this stage is as shown in FIG. 6. The support 88A, with its components may be inserted in the chamber 88 with the electronic components facing upwardly, as shown in FIG. 6. This facilitates the later potting of this section, so that the module in its final form may appear as shown in FIG. 7.

If desired, however, the support or circuit board 88A, with its components, may be mounted in inverted relation in the chamber 88. This facilitates the making of connections to the components at the back of the board 88A. The finished module nevertheless will also appear as shown in FIG. 7.

In either case, of course, the components in chamber 86 are perfectly potted first and subjected to tests. If not satisfactory in all respects, the partially completed module may be discarded after salvaging the electronic components mounted on the insulating support 88A.

It is also within the contemplation of the invention that the components in chamber 80 of the module 31 may not be potted at all, if desired. It will be obvious that the breaker casing parts 14 and 16 will hold these parts securely in position.

In any case, the assembled module 31 is placed in the breaker and retained therein by the parts 14 and 16 which are securely attached together by suitable means such as by rivets 19.

It will thus be seen that there is provided, in accordance with the invention, a miniature circuit breaker with electronic tripping means wherein the elecronic trip-signal generating means comprising a current-unbalance signal generating transformer, and if desired, other signal generating transformers, may be carefully adjusted in position and "calibrated" in one compartment of a two compartmented housing of a sub-assembly or "module," then fixedly retained in such calibrated position. The module may then be tested. Those modules which do not meet all requirements may be segregated, and the components in chamber 80 may be salvaged, and the remainder discarded.

If the module meets all required tests, then the electronic circuitry in chamber 80 may be potted or not, as desired. In high volume production, as required by such devices, my invention achieves a very substantial cost saving.

It is also within the contemplation of the invention that the circuit breaker of the invention may be constructed as described but without use of a potting compound in either compartment of the electric module. In this case, a barrier wall would still be included, to provide the functions of assisting in positioning and electrically separating the electric signal generating means and the signal processing means.

In this case, it will be obvious that if the testing of the complete circuit breaker indicates that the portions of the circuit breaker contained in either chamber 80 or 86 are defective, all of the parts in the other chamber of the circuit breaker casing may be salvaged, and only the defective parts removed and replaced.

While the invention has been shown and described in only certain specific forms, it will be readily apparent that many modifications thereof may easily be made. It is therefore intended, by the appended claims, to cover all such modifications as fall within the true spirit and scope of the invention.

I claim:

1. An electric module for inclusion in a generally rectangular insulating casing of an electric circuit breaker of the type having at least two separable contacts within the casing, mechanical operating means for operating the contacts between open and closed circuit conditions, manually operable means for operating the operating mechanism, electrically operable means for operating the operating mechaism at least so as to move the contacts from the closed to the open circuit condition, said module comprising:

a. a housing having first and second integrally formed, generally tray-shaped compartments separated by a common, intermediate barrier wall;

b. said module having first electrical components in said first compartment and second electrical components in said second compartment, said first components including means for detecting an unbalance of current passing through the circuit breaker contacts to a power consuming load compared to current returning from the load through a load return conductor and means for generating a signal in response to the unbalance of the currents, and said second components including means responsive to the electrical signal from said generating means of a predetermined magnitude to cause actuation of the circuit breaker electrically operable means and operation of the circuit breaker operating mechanism;

c. an insulating potting compound in said first compartment at least partially embedding said first electrical components and preventing movement of said first components during handling and testing of said module as well as during use of said module after assembly in said circuit breaker, said barrier wall preventing said potting compound in said first compartment from flowing into said second compartment, whereby said first components may be at least partially embedded in said potting compound and said module may be handled and tested, and said second components assembled in said second compartment without said potting compound flowing into said second compartment, whereby said second components may be salvaged from such module if said module does not meet tests on said module after complete assembly and after assembly into said circuit breaker.

2. An electric module as set forth in claim 1 wherein said second components comprise solid state electronic components.

3. An electric module as set forth in claim 1 wherein said second components are fixedly attached to an insulating support plate received in said second compartment and wherein said barrier wall includes notches receiving conductors interconnecting said first and second components.

4. An electric circuit breaker comprising:
   a. a main insulating casing;
   b. an insulating wall dividing said main insulating casing into at least first and second main compartments;
   c. at least one pair of separable contacts in said first main compartment of said insulating casing;
   d. mechanical operating means in said first main compartment for operating said contacts between closed and open circuit position;
   e. said mechanical operating means including manually operable means comprising a manually engageable operating handle projecting from said main insulating casing;
   f. electrically operable means in at least one of said first and second main compartments of said casing for operating said operating mechanism to cause movement of said contacts from said closed to said open circuit position;
   g. an electric module in said second main compartment of said insulating casing, said electric module including signal generating and processing means electrically connected to said electrically operable means to cause actuation of said electrically operable means upon the generation of a predetermined electrical signal by said signal generating means;
   h. said electric module comprising an insulating support having a generally planar backwall and peripheral upstanding sidewall and an intermediate barrier wall forming at least a first and a second compartment;
   i. said first compartment of said moudle containing electric signal generating means capable of generating an electric signal upon the occurrence of a relatively small ground fault in a circuit connected to said electric circuit breaker;
   j. electric signal processing means in said second compartment of said module connected to said signal generating means and also connected to said electrically operable means for operating said operating mechanism of said circuit breaker;
   k. said barrier wall serving to electrically separate said signal generating means from said signal processing means, and said barrier wall also serving to physically position at least one of said electric signal generating means and said signal processing means.

5. An electric circuit breaker as set forth in claim 4 wherein said electrically operable means comprises an electrical solenoid positioned in said second main compartment and mechanically connected to said mechanism in said first main compartment of said circuit breaker casing.

6. An electric circuit breaker as set forth in claim 4 wherein said circuit breaker also includes an external test button and means connected electrically in circuit to apply a predetermined test current to said electric module to test operation thereof upon operation of said test button.

7. An electric circuit breaker as set forth in claim 6 wherein said signal generating means in said first compartment of said module comprises means for generating a signal in response to an unbalance in current going through said separable contacts to an external load as compared to current in a conductor returning from said load to the opposite side of the circuit.

8. An electric circuit breaker as set forth in claim 7 wherein said circuit breaker includes solid state electronic components in said second compartment, including at least one gate-controlled semi-conductor device capable of supplying current to said solenoid to cause tripping operation of said circuit breaker.

9. An electric circuit breaker as set forth in claim 4 wherein said circuit breaker also includes in said first compartment of said circuit breaker casing, inverse-time current responsive means for automatic opening of said operating mechanism and direct-acting current responsive means for causing opening movement of said operating mechanism.

10. The method of constructing and assembling an electronic tripping module for use in a miniature circuit breaker which comprises the steps of:
   a. forming a generally tray-shaped housing of insulating material having a generally planar back wall, upstanding peripheral side walls and a barrier wall extending transversely of said housing between a pair of said side walls to form a first and a second compartment in said housing;
   b. positioning and connecting together electric signal generating components in said second compartment;
   c. positioning and connecting together electric signal processing components in said first compartment;
   d. connecting said signal generating components to said signal processing components within said housing by electrical conductors passing through at least a portion of said barrier wall;
   e. embedding said signal processing components in said first compartment in an insulating potting compound without embedding said signal processing components in said second compartment.

11. The method of constructing and ssembling an electronic tripping module for use in a miniature circuit breaker as set forth in claim 10 wherein said method also includes the steps of:
   a. testing said module to determine its electrical performance.
   b. embedding said signal processing components in an insulating compound following said testing.

12. The method of constructing and assembling a miniature electric circuit breaker having electronic tripping means which comprises the steps of:
   a. forming a multi-part main insulating casing for said circuit breaker having at least first and second main compartments;

b. forming a generally tray-shaped housing of insulating material having a generally planar back wall and peripheral upstanding side walls and a barrier wall extending transversely of said housing between a pair of said side walls to form a first and second compartment in said housing;

c. positioning and connecting together electric signal generating components in said first compartment;

d. positioning and connecting together electric signal processing components in said second compartment;

e. connecting said signal generating components to said signal processing components within said hosuing by electrical conductors passing over or through at least a portion of said barrier wall;

f. embedding said signal generating components in said first compartment in an insulating potting compound without embedding said signal processing components in said second compartment;

g. assembling said module into said main insulating casing and connecting it electrically to said circuit breaker;

h. assembling said circuit breaker casing parts so as to enclose and retain said module in position in said circuit breaker casing whereby to prevent significant movement of said components in said second compartment even though said components are not embedded in potting compound.

* * * * *